United States Patent
Nakano et al.

(10) Patent No.: US 11,037,743 B2
(45) Date of Patent: Jun. 15, 2021

(54) ELECTRONIC DEVICE

(71) Applicant: Dynabook Inc., Tokyo (JP)

(72) Inventors: Masanori Nakano, Koto Tokyo (JP); Shigenobu Sato, Koto Tokyo (JP)

(73) Assignee: Dynabook Inc., Tokyo (JP)

( * ) Notice: Subject to any disclaimer, the term of this patent is extended or adjusted under 35 U.S.C. 154(b) by 0 days.

(21) Appl. No.: 16/457,672

(22) Filed: Jun. 28, 2019

(65) Prior Publication Data

US 2020/0135419 A1   Apr. 30, 2020

(30) Foreign Application Priority Data

Oct. 26, 2018 (JP) .............................. JP2018-202004

(51) Int. Cl.
*G06F 1/16* (2006.01)
*G06F 3/02* (2006.01)
*H01H 13/86* (2006.01)

(52) U.S. Cl.
CPC ........... *H01H 13/86* (2013.01); *G06F 1/1666* (2013.01); *G06F 3/0221* (2013.01); *H01H 2223/05* (2013.01)

(58) Field of Classification Search
None
See application file for complete search history.

(56) References Cited

U.S. PATENT DOCUMENTS

| | | | | |
|---|---|---|---|---|
| 5,941,648 A | * | 8/1999 | Robinson | .............. G06F 1/1626 400/100 |
| D416,008 S | * | 11/1999 | Robinson | ..................... D14/393 |
| 6,587,675 B1 | * | 7/2003 | Riddiford | ............. G06F 1/1616 455/557 |
| 9,547,438 B2 | | 1/2017 | Bromer | |
| 9,823,752 B2 | | 11/2017 | Bromer | |
| 2002/0063690 A1 | * | 5/2002 | Chung | .................... G06F 1/166 345/168 |
| 2005/0164752 A1 | * | 7/2005 | Lau | ..................... H04M 1/0247 455/575.3 |
| 2012/0293935 A1 | * | 11/2012 | Sherlock | ............... G06F 1/1666 361/679.03 |

FOREIGN PATENT DOCUMENTS

| | | |
|---|---|---|
| JP | 2005-148855 A | 6/2005 |
| JP | 2014-515147 A | 6/2014 |
| JP | 2015-038645 A | 2/2015 |
| JP | 3204244 U | 5/2016 |

* cited by examiner

*Primary Examiner* — Curtis A Kuntz
*Assistant Examiner* — Jerold B Murphy
(74) *Attorney, Agent, or Firm* — Knobbe, Martens, Olson & Bear, LLP

(57) ABSTRACT

According to one embodiment, a keyboard PC includes a processor, a foldable keyboard, a housing, and an output terminal. The foldable keyboard comprises a first keyboard part and a second keyboard part. The housing that encloses the processor comprises a first housing part and a second housing part. The first housing part comprises the first keyboard part. The second housing part comprises the second keyboard part. The first housing part and the second housing part are configured to be opened or closed relative to one another by folding the housing. The output terminal supplies an image signal output from the processor to a display device.

19 Claims, 7 Drawing Sheets

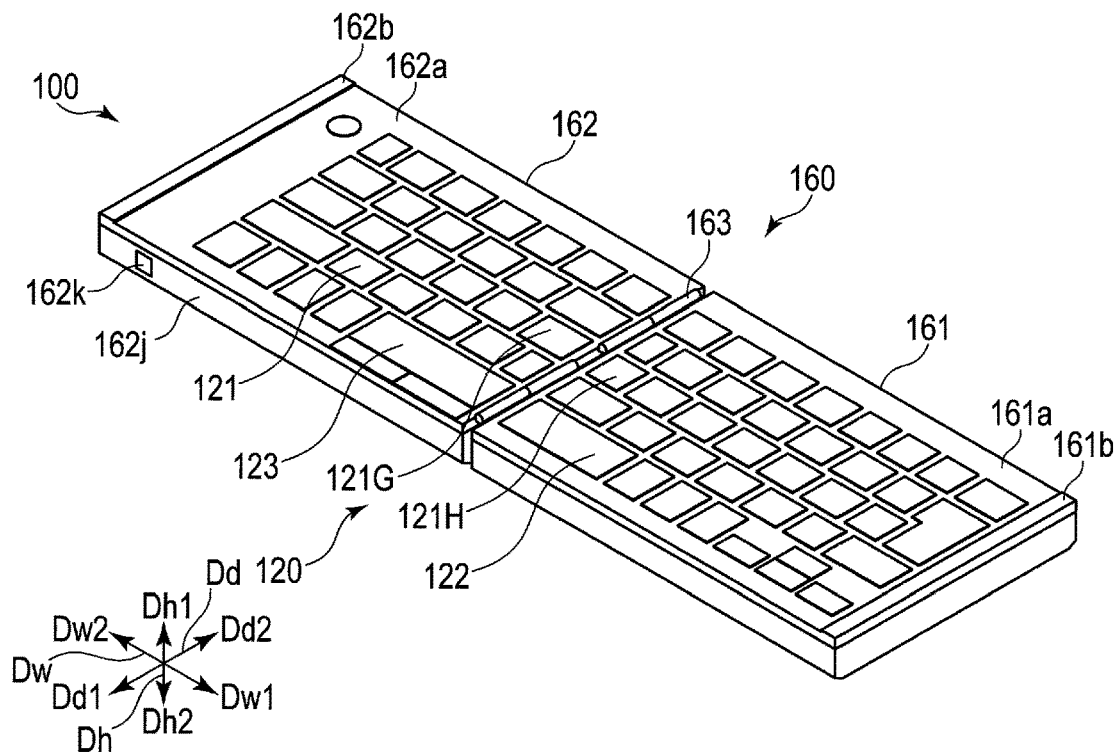
F I G. 2A
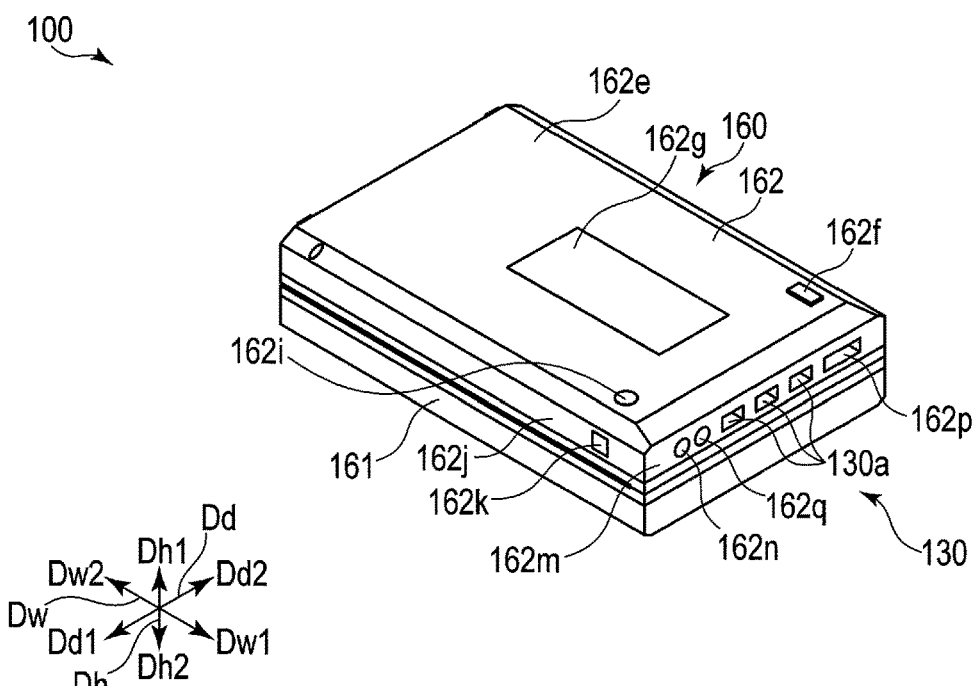
F I G. 2B

ELECTRONIC DEVICE

CROSS-REFERENCE TO RELATED APPLICATIONS

This application is based upon and claims the benefit of priority from Japanese Patent Application No. 2018-202004, filed Oct. 26, 2018, the entire contents of which are incorporated herein by reference.

FIELD

Embodiments described herein relate generally to an electronic device.

BACKGROUND

A technique for aiming at downsizing by configuring a keyboard in such a manner as to be divisible into two parts is known. Even when this technique is used, in order to output information including an image to a display device such as a display, a personal computer main body provided with a CPU (Central Processing Unit) becomes separately necessary.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2A is an exemplary perspective view showing the keyboard PC 100 in such a manner that the right side Dw1 thereof can visually be confirmed in the opened state.

FIG. 2B is an exemplary perspective view showing the keyboard PC 100 of the arrangement of FIG. 2A in the closed state.

DETAILED DESCRIPTION

Figure 1A:
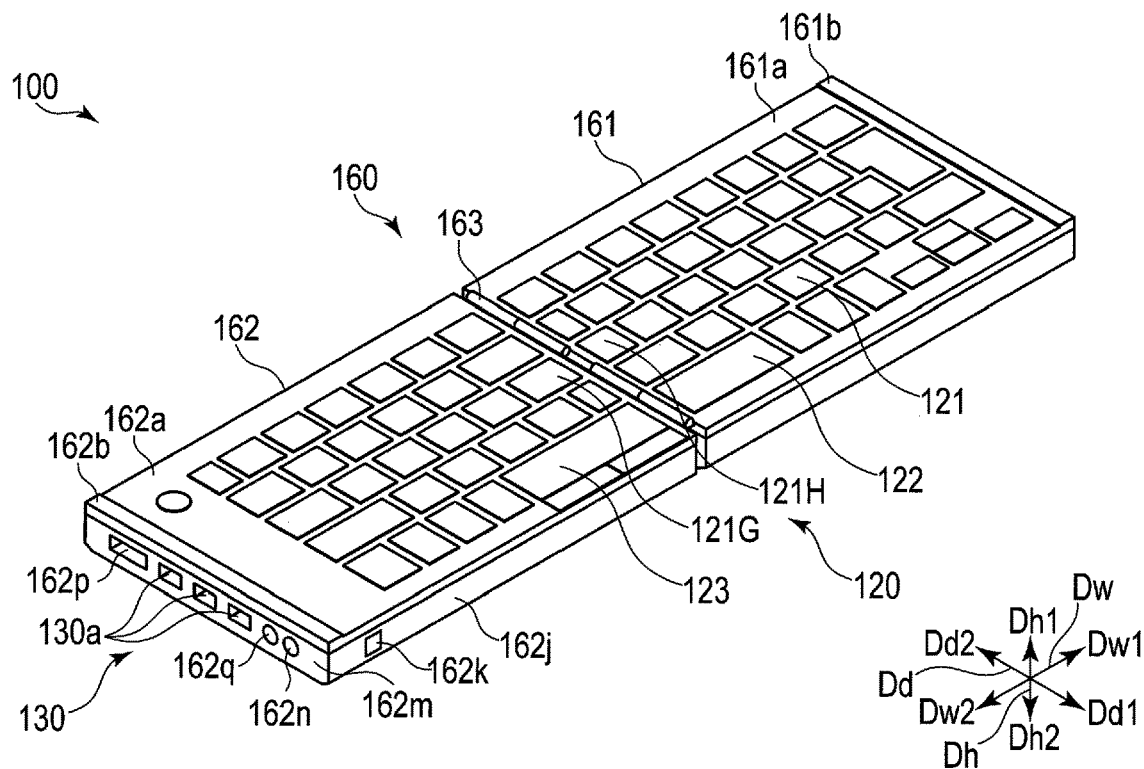
FIG. 1A is an exemplary perspective view showing a foldable keyboard PC 100 of a first embodiment in such a manner that the left side Dw2 thereof can visually be confirmed in an opened state of the keyboard PC 100.

Various embodiments will be described hereinafter with reference to the accompanying drawings. The disclosure is merely an example and is not limited by contents described in the embodiments described below. Modification that is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by similar reference numerals and their detailed descriptions may be omitted unless necessary. In the drawings, the width direction Dw (right side Dw1, left side Dw2), depth direction Dd (front side Dd1, inner side Dd2) and height direction Dh (upper side Dh1, lower side Dh2) of a keyboard PC 100 are indicated by arrows.

In general, according to one embodiment, a keyboard PC includes a processor, a foldable keyboard, a housing, and an output terminal. The processor is called an arithmetic unit in the embodiments. The arithmetic unit carries out arithmetic processing. The foldable keyboard comprises a first keyboard part and a second keyboard part. The first keyboard part includes a space key 122, a key 121H, and any keys 121 in the embodiments. The second keyboard part includes a touch pad 123, a key 121G, and other keys 121 in the embodiments. The housing encloses the processor and comprises a first housing part and a second housing part. The first housing part comprises the first keyboard part. The second housing part comprises the second keyboard part. The first housing part and the second housing part are configured to be opened or closed relative to one another by folding the housing. The output terminal supplies an image signal output from the processor to a display device.

With reference to FIG. 1 through FIG. 6, the configuration of a foldable keyboard PC 100 of the embodiment will be described below.

The keyboard PC 100 (called an electronic device in claims) includes an arithmetic unit 110, an input housing 120, an output terminal 130, an antenna unit 140, a power-supply unit 150, and a housing unit 160. Descriptions will be given of the units constituting the keyboard PC 100 from the arithmetic unit 100 to the housing unit 160 in sequence.

Figure 6:
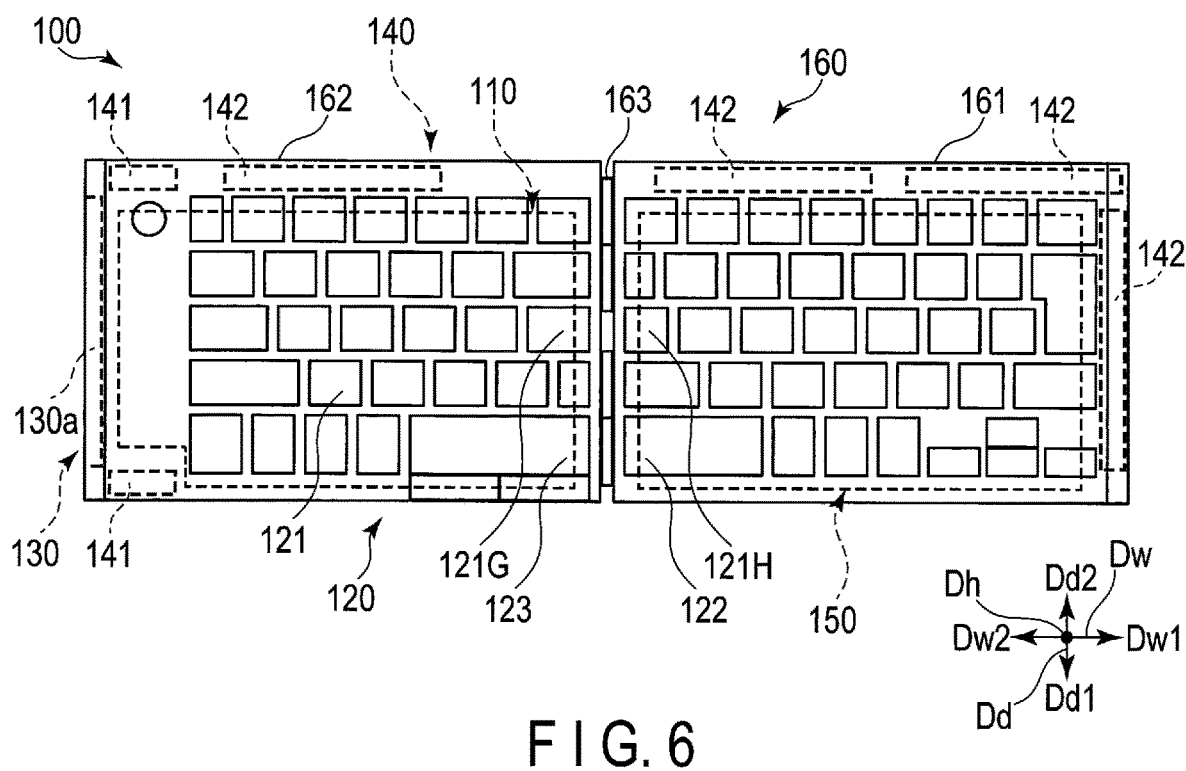
FIG. 6 is an exemplary top view showing the keyboard PC 100 in the state where the inside thereof is shown by a broken line.

As shown in FIG. 6, the arithmetic unit 110 is a unit configured to carry out arithmetic processing.

The arithmetic unit 110 is provided with a board or the like on which a Read Only Memory (ROM), a Central Processing Unit (CPU), a Random Access Memory (RAM), and the like are mounted. The arithmetic unit 110 recognizes the configuration of a wearable display device 500 (shown in FIG. 7, and called a display device in claims) through the output terminal 130, and outputs an image signal in a form made conformable to the electrical specifications of the wearable display device 500. The arithmetic unit 110 recognizes the configuration of the wearable display device 500 through the output terminal 130, and outputs an image signal in a form made conformable to a corresponding application of the wearable display device 500. The housing unit 160 is divided into a first housing part 161 and a second housing part 162. The arithmetic unit 110 is retained inside one of the first housing part 161 (also called a right part) and the second housing part 162 (also called a left part). For example, assume that the arithmetic unit 110 is included in the second housing part 162.

As shown in FIG. 1A, FIG. 2A, FIG. 3, FIG. 5, and FIG. 6, the input housing 120 is a unit by which operations such as input and the like are carried out by the user.

The input housing 120 is provided with, for example, a keyboard having mechanical keys 121 configured to input data to the arithmetic unit 110. The keys 121 are arranged in QWERTY layout. A first half of the keys 121 which the user can easily operate with his or her left hand and includes a key 121G capable of inputting a key signal of G to the arithmetic unit 110 is provided at the second housing part 162. Further, a second half of the keys 121 which the user can easily operate with his or her right hand and includes a key 121H capable of inputting a key signal of H to the arithmetic unit 110 is provided at the first housing part 161. In other words, the input housing 120 is divided into two parts with a gap between the key 121G of G and key 121H of H regarded as the boundary of the division. The input housing 120 is provided with a space key 122 at the first housing part 161, and is provided with a touch pad 123 at the second housing part 162. The touch pad 123 is used to move a pointer, and to open or close an application. The space key 122 and touch pad 123 are positioned adjacent to each other in the state where the first housing part 161 and second housing part 162 are opened.

As shown in FIG. 1A, FIG. 2B, and FIG. 6, the output terminal 130 is a unit configured to output information, calculated by the arithmetic unit 110 and including an image signal, to a wearable display device 500, and the like.

The output terminal 130 is provided with output terminals 130a configured to output information including an image signal. The output terminals 130a are conformed to, for example, the type-C Universal Serial Bus (USB). The output terminals 130a are retained in a side face, for example, a left side face 162m of the second housing part 162. A mouse or the like may be connected to the output terminal 130a, or the output terminal 130a may be used for supply power to the keyboard PC 100. The arithmetic unit 110 communicates with the wearable display device 500 to be described later by a cable conforming to a standard such as HDMI (registered trade mark), USB Type-C or the like or wireless conforming to a standard such as WiFi, Bluetooth (registered trade mark) or the like.

As shown in FIG. 6, the antenna unit 140 is a unit connected to the arithmetic unit 110 and configured to transmit/receive data to/from the outside by means of a radio wave.

The antenna unit 140 is provided with WiFi antennas 141 and LTE antennas 142 (called antenna elements in claims) which are connected to the arithmetic unit 110, and are capable of transmitting/receiving a radio wave. It should be noted that WiFi and LTE are respectively registered trademarks. Particularly, by means of the LTE antennas 142, not only so-called 4G communication but also 5G communication is used to carry out high-speed low-delay mobile network communication. As shown in FIG. 6, the Wireless Fidelity (Wi-Fi) antennas 141 are arranged in such a manner that, for example, one of them is positioned on the front side Dd1 of the left side Dw2 of the second housing part 162 and the other of them is positioned on the inner side Dd2 of the left side Dw2 thereof in opposition to each other. As shown in FIG. 6, the Long Term Evolution (LTE) antennas 142 are arranged in such a manner that, for example, two of them are positioned on the inner side Dd2 of the first housing part 161 in the width direction Dw, one of them is positioned on the right side Dw1 of the first housing part 161, and one of them is positioned on the inner side Dd2 of the second housing part 162. The WiFi antennas 141 and the LTE antennas 142 are provided in the first housing part 161 or second housing part 162 at positions of the outer edges not overlapping with the arithmetic unit 110.

As shown in FIG. 6, the power-supply unit 150 is a unit configured to supply electric power to the arithmetic unit 110 and the like.

The power-supply unit 150 is constituted of, for example, a converter configured to convert AC power input from outside to DC power and adjust the voltage value and the like, and repetitively rechargeable lithium-ion secondary battery. The power-supply unit 150 is retained inside, for example, the first housing part 161.

As shown in FIG. 1A through FIG. 6, the housing unit 160 is a unit configured to retain therein the arithmetic unit 110, the input housing 120, the output terminal 130, the antenna unit 140, and the power-supply unit 150 in an integrated manner.

As shown in FIG. 1A and the like, the housing unit 160 is constituted of the first housing part 161 and the second housing part 162 connected to each other in such a manner that the parts 161 and 162 can be opened/closed in a state where the input housing 120 is divided into two parts, and a hinge 163 configured to support the first housing part 161 and the second housing part 162 in such a manner that the parts 161 and 162 can be opened/closed.

The first housing part 161 and the second housing part 162 are opened/closed without straddling any keys 121 of the input housing 120. The first housing part 161 and the second housing part 162 are formed in such a manner that, in the state where the parts 161 and 162 are opened, the thicknesses in the height direction at each of both ends is less than that at the center.

Figure 3:
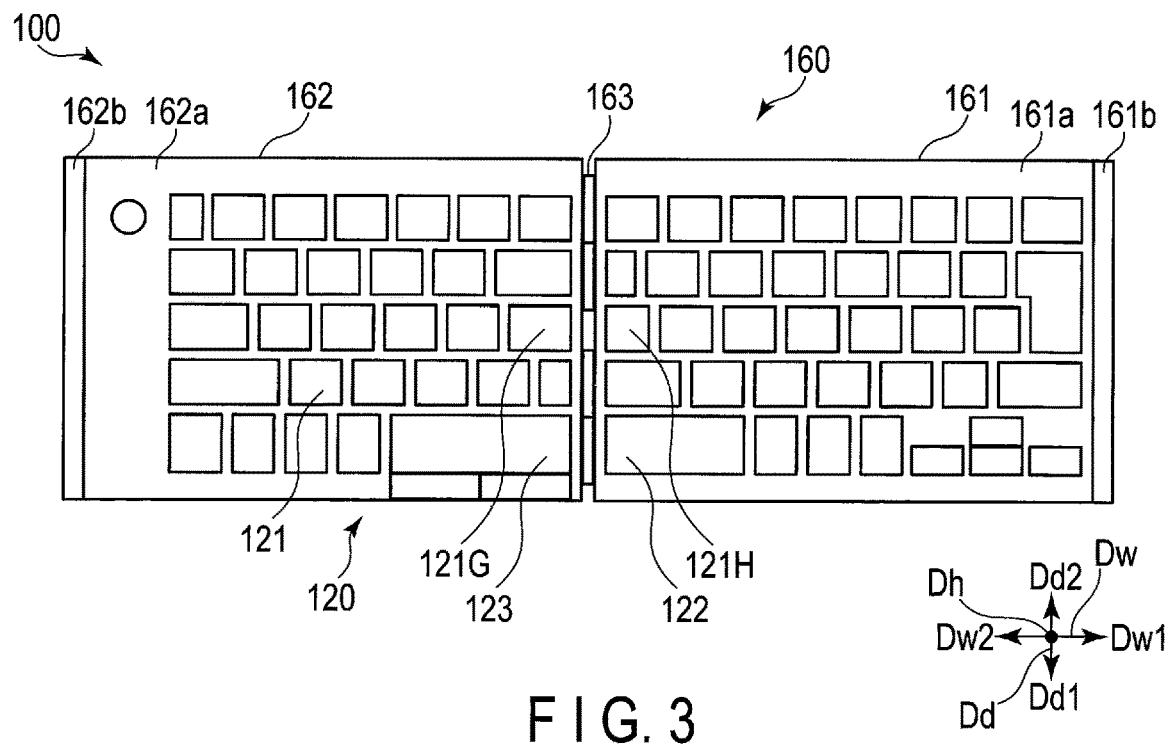
FIG. 3 is an exemplary top view showing the keyboard PC 100 seen from the upper side Dh1 thereof toward the lower side Dh2 thereof.

As shown in FIG. 3 and the like, in the first housing part 161, the right side area of the input housing 120 is provided on the top surface 161a. As shown in FIG. 6, in the first housing part 161, part of the antenna unit 140 and the power-supply unit 150 are accommodated.

As shown in FIG. 3 and the like, on the first housing part 161, a first butting section 161b configured to protect the input housing 120 by butting against the second housing part 162 in the state where the first housing part 161 and the second housing part 162 are closed is provided on the right side Dw1 of the top surface 161a.

Figure 1B:
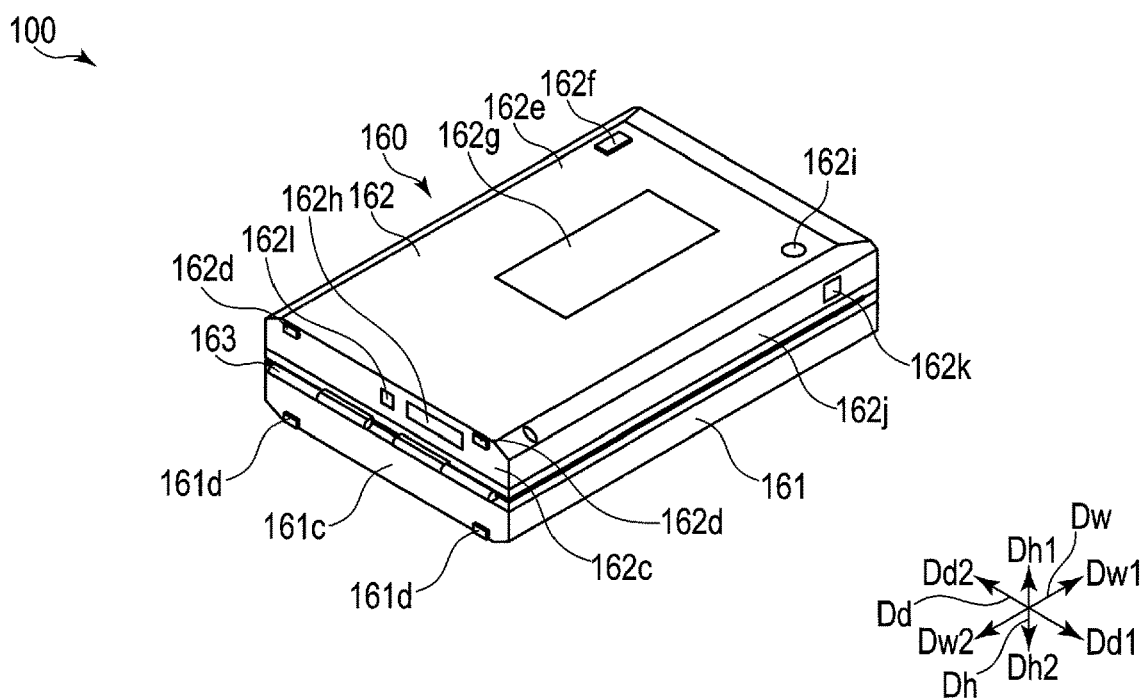
FIG. 1B is an exemplary perspective view showing the keyboard PC 100 of the arrangement of FIG. 1A in a closed state.

As shown in FIG. 1B and the like, on the first housing part 161, elastically-deformable first shock-absorbing members 161d are provided at the lower side Dh2 of the left side face 161c to be opposed to the second housing part 162 in the state where the first housing part 161 and the second housing part 162 are opened.

Figure 4:
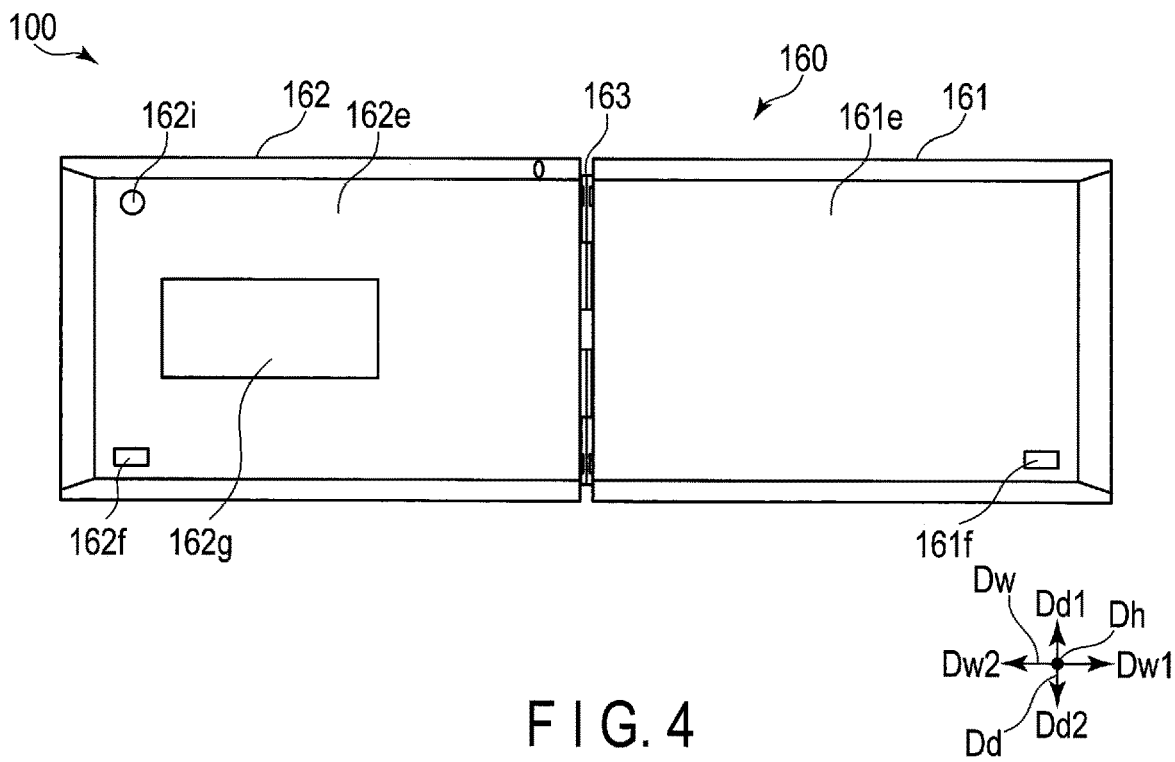
FIG. 4 is an exemplary bottom view showing the keyboard PC 100 seen from the lower side Dh2 thereof toward the upper side Dh1 thereof.
Figure 5:
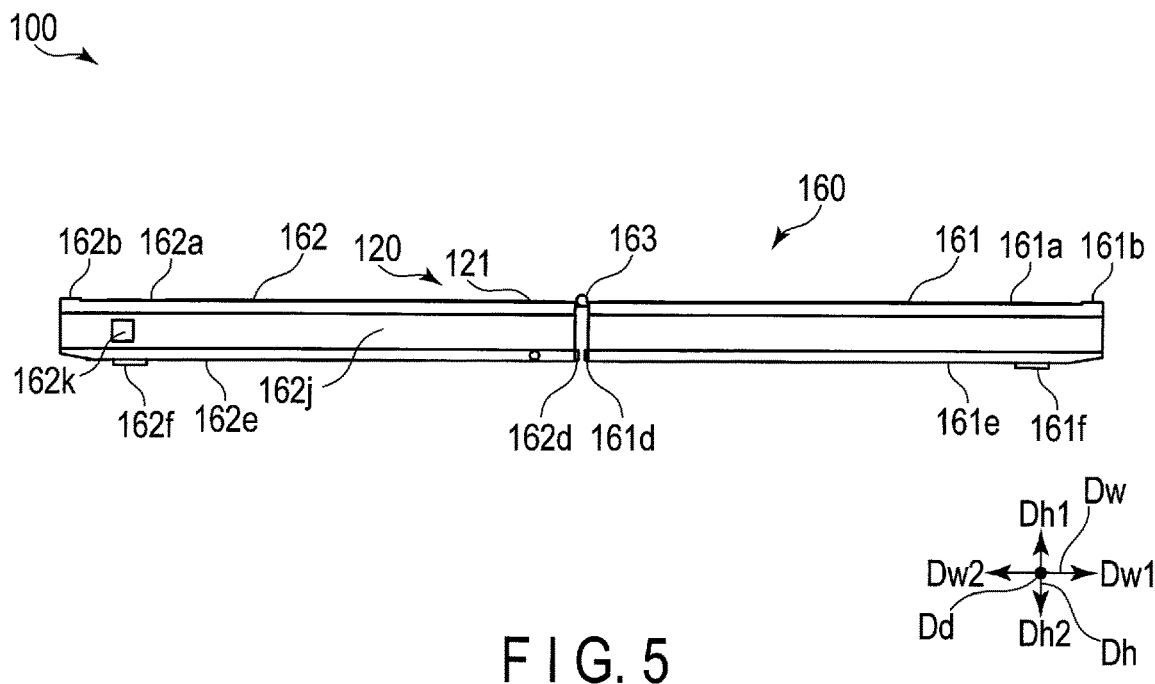
FIG. 5 is an exemplary front view showing the keyboard PC 100 seen from the front side Dd1 thereof toward the inner side Dd2 thereof.

As shown in FIG. 4 and the like, on the first housing part 161, a foot section 161f (called an outermost section in claims) is provided on the undersurface 161e. The foot section 161f is provided in such a manner as to partially protrude from the right side Dw1 part of the inner side Dd2 of the undersurface 161e toward the lower side Dh2. The foot section 161f is constituted of a rubber foot or tilt stand.

As shown in FIG. 3 and the like, in the second housing part 162, the left side area of the input housing 120 is provided on the top surface 162a. As shown in FIG. 6, in the second housing part 162, the arithmetic unit 110 and a part of the antenna unit 140 are accommodated.

As shown in FIG. 3 and the like, on the second housing part 162, a second butting section 162b configured to protect the input housing 120 by butting against the first butting section 161b of the first housing part 161 in the state where the first housing part 161 and the second housing part 162 are closed is provided on the left side Dw2 of the top surface 162a. The butting surface of at least one of the first butting section 161b and the second butting section 162b is located in a position protruding from the keys disposed on the top surface 161a or 162a where the at least one is provided. With this structure, even if the device is set in a closed state while the power is on, it is possible to prevent erroneous operation on the keys by pushing the keys each other.

As shown in FIG. 1B and the like, on the second housing part 162, elastically-deformable second shock-absorbing members 162d are provided at the lower side Dh2 of the right side face 162c to be opposed to the first housing part 161 in the state where the first housing part 161 and the second housing part 162 are opened. The second shock-absorbing members 162d are opposed to the first shock-absorbing members 161d with gaps held between them in the state where the first housing part 161 and the second housing part 162 are opened. The first shock-absorbing members 161d and the second shock-absorbing members 162d butt against each other when each of the first housing part 161 and the second housing part 162 is opened by an angle exceeding 180° to limit a rotation of each of the first housing part 161 and the second housing part 162 greater than or equal to 180°.

As shown in FIG. 4 and the like, on the second housing part 162, a foot section 162f (called an outermost section in claims) is provided on the undersurface 162e. The foot section 162f is provided in such a manner as to partially protrude from the left side Dw2 part of the inner side Dd2 of the undersurface 162e toward the lower side Dh2. The foot section 162f is constituted of a rubber foot or tilt stand.

On the second housing part 162, an external touch pad 162g (shown in FIG. 1B, FIG. 2B, and FIG. 4, and called an operating section in claims) is provided on the undersurface 162e (shown in FIG. 1b, FIG. 2b, and FIG. 4, and called an external surface in claims). In the second housing part 162, a SIM slot connector 162h (shown in FIG. 1B, and called an insertion section in claims) which is electrically connected to the arithmetic unit 110 and into which a SIM can be inserted is provided in the right side face 162c (called a counter surface in claims).

In the second housing part 162, a CCD camera 162i (shown in FIG. 1B, FIG. 2B, and FIG. 4) configured to start and stop the arithmetic unit 110 on the basis of authentication based on the biological information of the user is provided in the undersurface 162e. The CCD camera 162i is connected to the arithmetic unit 110. The biological information is, for example, the face of the user, a retina of an eye, a vein of a palm or the like. Further, in the second housing part 162, as in the case of the CCD camera 162i (shown in FIG. 1B, FIG. 2B, and FIG. 4), a fingerprint sensor 162k (shown in FIG. 1A, FIG. 1B, FIG. 2A, FIG. 2B, and FIG. 5) capable of authentication based on the biological information of the user is provided in the front face 162j.

The fingerprint sensor 162k can simply and easily be used irrespective of the opened/closed state of the housing unit 160.

In the second housing part 162, an open/close sensor 162l (shown in FIG. 1B) configured to detect the opened/closed state of the first housing part 161 and the second housing part 162 is provided in the right side face 162c. The open/close sensor 162l is constituted of, for example, an optical sensor, and is configured to detect whether or not the left side face 161c of the first housing part 161 is in close vicinity thereto. The open/close sensor 162l may also be configured in such a manner that the sensor 162l is provided in the second housing part 162 in a part of the top surface 162a opposed to the top surface 161a in the state where the top surface 161a of the first housing part 161 and the top surface 162a of the second housing part 162 are closed.

In the second housing part 162, a power button 162n (shown in FIG. 1A and FIG. 2B) is provided in the left side face 162m (with respect to the position of the user at the time of use) on the foremost side Dd1. In the second housing part 162, a High-Definition Multimedia Interface (HDMI) terminal 162p (shown in FIG. 1A and FIG. 2B) is provided in the left side face 162m (with respect to the position of the user at the time of use) on the inner side Dd2. HDMI is a registered trademark. In the second housing part 162, an HP terminal 162q (shown in FIG. 1A and FIG. 2B) for sound is provided in the left side face 162m on the front side Dd1.

As shown in FIG. 1 through FIG. 6, the hinge 163 causes the first housing part 161 and the second housing part 162 to be opened/closed with respect to each other with the boundary part at the upper side Dh1 at which the first housing part 161 and the second housing part 162 are adjacent to each other used as the rotational center.

Figure 7:
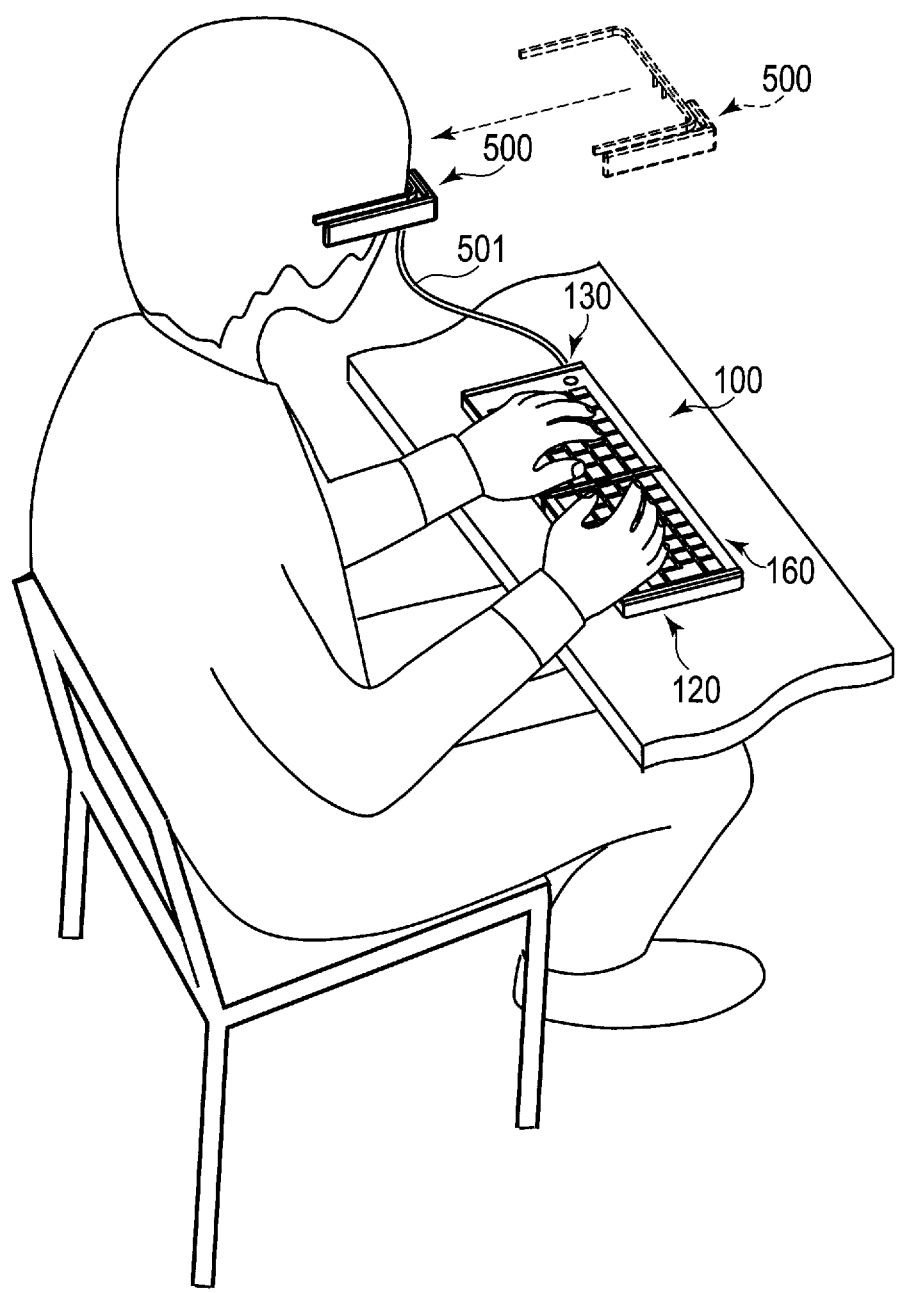
FIG. 7 is an exemplary schematic view showing how to use the keyboard PC 100.

How to use the keyboard PC 100 will be described below with reference to FIG. 7.

The user can operate the keyboard PC 100 by using the keys 121, touch pad 123, and the like of the input housing 120 while visually confirming information including an image projected onto the wearable display device 500 connected to the keyboard PC 100 through a cable 501.

Particularly, by using the wearable display device 500 as the external display device, the user can carry out personal computer work accompanied by secrecy. In other words, the user can carry out personal computer work at a place at which unspecified people are present while keeping secret information. The personal computer work in this case is work in which the user carries out an input operation from a keyboard, a mouse, a touch pad or the like while viewing a display terminal to thereby cause the computer to execute arithmetic processing, whereby the user carries out a job or the like. This work is also called Visual Display Terminal (VDT) work.

Further, by using a liquid crystal display or the like, the user can carry out personal computer work accompanied by no secrecy outside the company, and can carry out personal computer work accompanied by secrecy at home or at a hotel of accommodation.

Particularly, in this embodiment, by taking advantage of the feature to be exhibited by combining the keyboard PC 100, the wearable display device 500 (actual view and PC image), and 5G communication (low-delay) with each other, it is possible to use a non-conventional new method. More specifically, for example, in the case of a situation in which more accuracy and real-time properties are required such as on-the-spot telecast of text delivery from a sports ground or the like, the delivery operator can carry out text delivery of a sports actual scene in real time without any delay while simultaneously viewing the image screen displayed on the wearable display device 500 and actual sports to be viewed over the wearable display device 500. The user can receive the delivery text in real time without any delay.

A usage form 1 (use in a facility made available to unspecified people) of the keyboard PC 100 will be described below with reference to FIG. 8A.

Figure 8A:
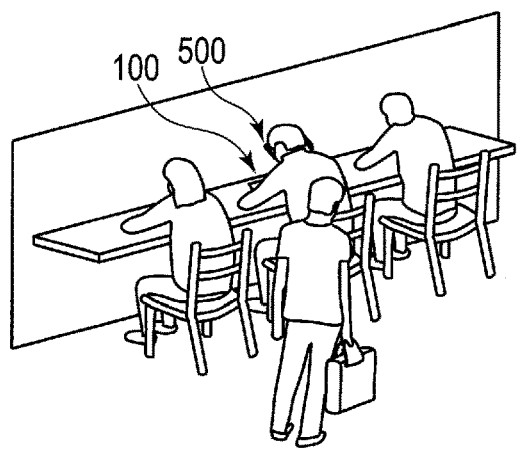
FIG. 8A is an exemplary schematic view showing the first usage example of the keyboard PC 100 where the keyboard PC 100 is used in a facility made available to unspecified people.

As shown in FIG. 8A, by using the wearable display device 500 as an external display device, the user can operate the keyboard PC 100 while keeping secrecy in a facility made available to unspecified people. As the facility, a shared office, a cafe, a library, and the like are conceivable. By using the keyboard PC 100 easy to carry around, the user can carry out an operation requiring an obligation to keep a secret in a facility which is a place outside the company and is utilized by unspecified people. In other words, the user can carry out a normal operation such as preparation of written materials for use inside the company or outside the company while keeping secrecy in a shared office or the like which is a place outside the company.

A usage form 2 (use in a train on which unspecified people are present) of the keyboard PC 100 will be described below with reference to FIG. 8B.

Figure 8B:
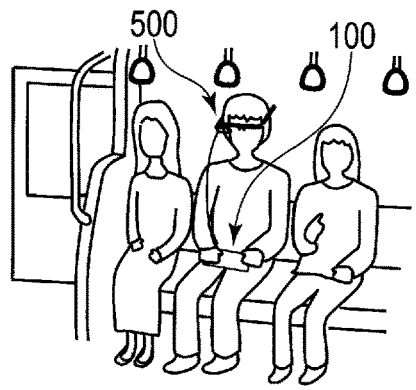
FIG. 8B is an exemplary schematic view showing the second usage example of the keyboard PC 100 where the keyboard PC 100 is used in a train or a bus on which unspecified people are present.

As shown in FIG. 8B, by using the wearable display device 500 as an external display device, the user can operate the keyboard PC 100 while keeping secrecy in a train utilized by unspecified people. By using the keyboard PC 100 easy to carry around, the user can carry out an operation requiring an obligation to keep a secret in a train which is a place outside the company and on which unspecified people are present. In other words, the user can carry out an operation of transmission/reception of mail during commuting in a train which is a place outside the company while keeping secrecy, or an operation of correction or the like of written materials to be presented to the client during a business trip.

A usage form 3 (use on a road along which unspecified people are passing) of the keyboard PC 100 will be described below with reference to FIG. 8C.

Figure 8C:
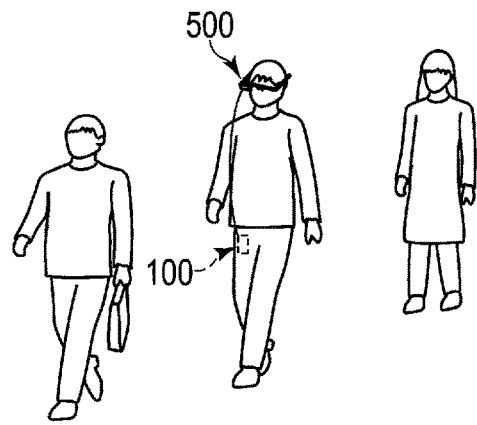
FIG. 8C is an exemplary schematic view showing the third usage example of the keyboard PC 100 where the keyboard PC 100 is used by a person walking on a road along which unspecified people pass in a situation in which the keyboard PC 100 is put in the clothes of the person.

As shown in FIG. 8C, by using the wearable display device 500 as an external display device, the user can use the keyboard PC 100 while keeping secrecy on a road along which unspecified people are passing. The user can carry the keyboard PC 100 by storing the keyboard PC 100 in a pocket or the like of the pants of the user.

Advantages of the keyboard PC 100 of the embodiment will be described below.

According to the embodiment, the housing unit 160 retains therein the arithmetic unit 110 and the output terminal 130, and is provided with the first housing part 161 and the second housing part 162 connected to each other in such a manner that the parts 161 and 162 can be opened/closed in a state where the input housing 120 is divided into two parts. According to the keyboard PC 100 having the configuration described above, it is possible to carry the keyboard PC 100 in a state where the first housing part 161 and the second housing part 162 are closed in a folded form. Accordingly, it is possible to configure the keyboard PC 100 easy to carry.

According to the embodiment, the second housing part 162 is provided with the external touch pad 162g configured to start and stop the arithmetic unit 110 on the external surface (undersurface 162e) thereof in the closed state. According to the keyboard PC 100 having the configuration described above, even when the first housing part 161 and the second housing part 162 are in the closed state, it is possible to start and stop the arithmetic unit 110.

According to the embodiment, the input housing 120 is provided with the touch pad 123. According to the keyboard PC 100 having the configuration described above, it is possible to easily move the pointer, and easily open or close an application by using the touch pad 123 without separately preparing a so-called mouse.

According to the embodiment, each of the first housing part 161 and the second housing part 162 retains therein the WiFi antennas 141 and the LTE antennas 142 at positions separate from the outermost sections (foot section 161f and foot section 162f). According to the keyboard PC 100 having the configuration described above, for example, even when the keyboard PC 100 is placed on a metallic steel desk with the foot section 161f and the foot section 162f in contact with the metallic steel desk, it is possible to keep the communication state fine. Furthermore, by providing the foot section 161f and the foot section 162f, it is possible to make the input housing 120 gently inclined to thereby make it easy for the user to carry out a key input.

According to the embodiment, the second housing part 162 is provided with a SIM slot connector 162h which is electrically connected to the arithmetic unit 110 and into which an external recording medium can be inserted in the counter surface to be opposed to the first housing part 161 when the first housing part 161 and the second housing part 162 are in the opened state, and to be exposed when the first housing part 161 and the second housing part 162 are in the closed state. According to the keyboard PC 100 having the configuration described above, it is possible to prevent the SIM slot connector 162 from being mistakenly subjected to detachment when the keyboard PC 100 is used in the state where the first housing part 161 and the second housing part 162 are opened, and facilitate attachment/detachment of the SIM slot connector 162h when the first housing part 161 and the second housing part 162 are in the closed state.

According to the embodiment, the second housing part 162 is provided with the CCD camera 162i (called a biometric sensor in claims) configured to start and stop the arithmetic unit 110 on the basis of authentication based on the biological information of the user. According to the keyboard PC 100 having the configuration described above, it is possible to prevent the keyboard PC 100 from being used by another person. Particularly, as shown in FIG. 8A, it is possible to prevent the keyboard PC 100 from being touched and operated by another person in a facility made available to unspecified people.

According to the embodiment, each of the first housing part 161 and the second housing part 162 retains therein the WiFi antennas 141 and the LTE antennas 142 at positions of the outer edges not overlapping with the arithmetic unit 110. According to the keyboard PC 100 having the configuration described above, it is possible to prevent interference between the arithmetic unit 110 and WiFi antennas 141 and LTE antennas 142 from occurring, and keep the communication state fine.

According to the embodiment, for example, the power-supply unit 150 is provided in the first housing part 161 and, for example, the arithmetic unit 110 is provided in the second housing part 162. According to the keyboard PC 100 having the configuration described above, even when the first housing part 161 and the second housing part 162 are configured in such a manner that the parts 161 and 162 can be opened/closed, it is possible to retain the power-supply unit 150 and the arithmetic unit 110 which are the constituent members without making significant design changes to the specifications of the existing notebook-sized personal computer.

According to the embodiment, for example, the space key 122 is provided in the first housing part 161 and, for example, the touch pad 123 is provided in the second housing part 162. The space key 122 and the touch pad 123 are positioned adjacent to each other with the connection section between the first housing part 161 and the second housing part 162 as the center of the adjacency in the state where the first housing part 161 and the second housing part 162 are opened. According to the keyboard PC 100 having the configuration described above, by arranging the space key 122 and the touch pad 123 in juxtaposition with each other at the central part which is the boundary between the area in which key input can easily be carried out by a left hand and the area in which key input can easily be carried out by a right hand, when a keyboard of a notebook-sized personal computer or the like is operated, it is possible to make it easy for the user to carry out a key operation.

According to the embodiment, the second housing part 162 is provided with the open/close sensor 162*l* configured to detect the opened/closed state of the first housing part 161 and the second housing part 162 in a part of the side face (right side face 162*c*) to be opposed to a side face of the first housing part 161 in the state where the first housing part 161 and the second housing part 162 are opened. According to the keyboard PC 100 having the configuration described above, it is possible to prevent the user from unintentionally operating the keyboard PC 100 in, for example, the closed state.

According to the embodiment, in the left side face 162*m* of the second housing part 162, the High-Definition Multimedia Interface (HDMI) terminal 162*p* (terminal) is provided on the inner side with respect to the position of the user at the time of use, and the HP terminal 162*q* (terminal) for sound is provided on the front side with respect to the position of the user at the time of use. According to the keyboard PC 100 having the configuration described above, it is possible to prevent interference between the HDMI terminal 162*p* and the HP terminal 162*q* from occurring when the user carries out an operation.

According to the embodiment, the first housing part 161 and the second housing part 162 are formed in such a manner that, in the state where the first housing part 161 and the second housing part 162 are opened, the thicknesses in the height direction at each of both ends is less than that at the center. According to the keyboard PC 100 having the configuration described above, in the state where the first housing part 161 and the second housing part 162 are closed, the thickness becomes gradually less from the folded base end to the leading end, whereby it is easy to carry the keyboard PC 100.

According to the embodiment, the first housing part 161 and the second housing part 162 are respectively provided with elastically-deformable first shock-absorbing members 161*d* and second shock-absorbing members 162*d* at portions of the side faces to be opposed to each other in the state where the first housing part 161 and the second housing part 162 are opened. According to the keyboard PC 100 having the configuration described above, the first shock-absorbing members 161*d* and the second shock-absorbing members 162*d* are made to be in contact with each other to limit the rotation of each of the first housing part 161 and the second housing part 162, whereby it is possible to prevent the first housing part 161 and the second housing part 162 from being excessively opened into a warped form and damaged.

According to the embodiment, the first housing part 161 retaining therein the power-supply unit 150 is configured in such a manner as to be able to choose a housing having a shape conformable to the size of the power-supply unit 150. According to the keyboard PC 100 having the configuration described above, it is possible to make the keyboard PC 100 easily compatible with, for example, the power-supply unit 150 increased in battery capacity and upsized for the purpose of prolonging the drive time.

According to the embodiment, the first housing part 161 and the second housing part 162 are connected to each other in such a manner that the first housing part 161 and the second housing part 162 can be opened/closed by dividing the input housing 120 into two parts with the gap between the key 121G capable of inputting a signal of G to the arithmetic unit 110 and the key 121H capable of inputting a signal of H to the arithmetic unit 110 as the boundary of the division and the pivot of the opening/closing. According to the keyboard PC 100 having the configuration described above, the input housing 120 is divided into two parts with the gap between the key 121G of G and the key 121H of H as the boundary of the division. When a keyboard of a notebook-sized personal computer or the like is operated by the user, the gap is regarded the boundary between the area in which key input can easily be carried out by the left hand of the user and the area in which key input can easily be carried out by the right hand of the user. Whereby it becomes easy for the user to recognize the central part which is the visual boundary.

According to the embodiment, the first housing part 161 and the second housing part 162 are opened/closed with respect to the connection section between the first housing part 161 and the second housing part 162 without straddling any keys 121 at the connection section. According to the keyboard PC 100 having the configuration described above, it is possible to realize the first housing part 161 and the second housing part 162 which are connected to each other in such a manner that the parts 161 and 162 can be opened/closed with a simple configuration.

According to the embodiment, the output terminals 130*a* are compatible with the type-C Universal Serial Bus (USB). According to the keyboard PC 100 having the configuration described above, by using the type-C USB of the versatile standard compatible with the video output, it is possible to output an image to the wearable display device 500 or the like.

According to the embodiment, the arithmetic unit 110 recognizes the configuration of the wearable display device 500 through the output terminal 130, and outputs an image signal in a form made conformable to the electrical specifications of the wearable display device 500. According to the keyboard PC 100 having the configuration described above, even when the keyboard PC 100 is connected to various types of wearable display devices 500 differing in electrical specifications, it is possible for the keyboard PC 100 to output information to the wearable display device 500 in a form made conformable to the electrical specifications of each of those wearable display devices 500.

According to the embodiment, the arithmetic unit 110 recognizes the configuration of the wearable display device 500 through the output terminal 130, and outputs an image signal in a form made conformable to a corresponding application of the wearable display device 500. According to the keyboard PC 100 having the configuration described above, even when the keyboard PC 100 is connected to various types of wearable display devices 500 differing in the corresponding application, it is possible for the keyboard PC 100 to output information to the wearable display device 500 in a form made conformable to the application of each of those wearable display devices 500.

Figure 9:
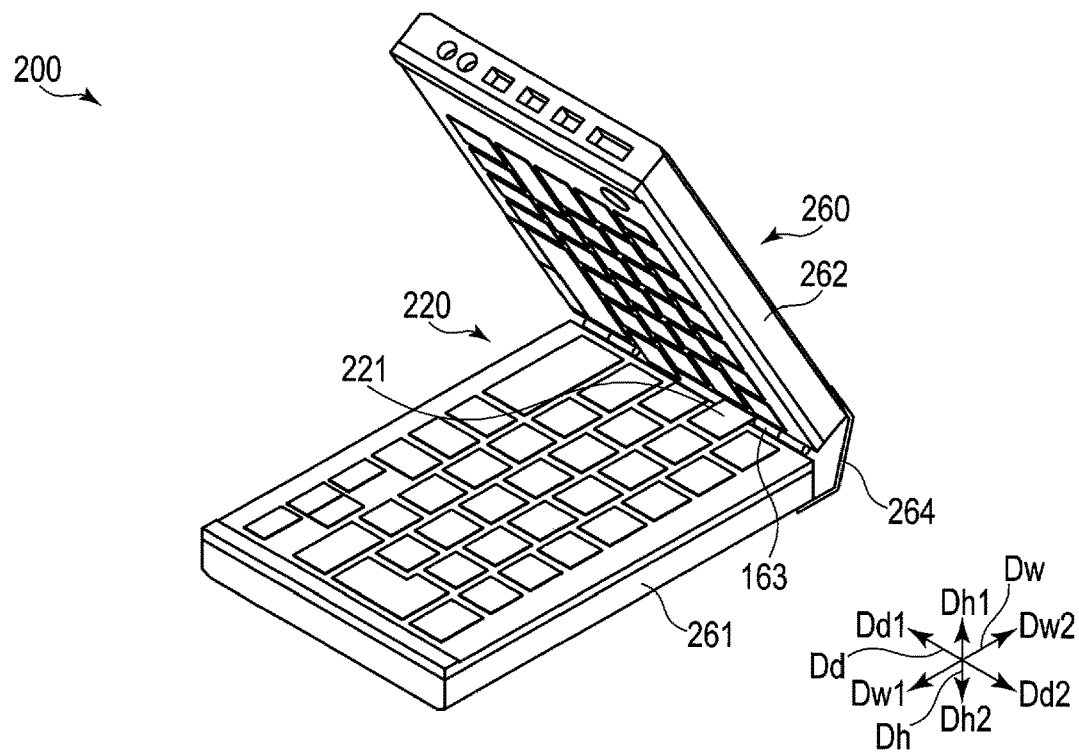
FIG. 9 is an exemplary perspective view showing a keyboard PC 200 of the first modification of the embodiment which can be folded in half with keys folded in half in a straddling manner.

The configuration of a keyboard PC 200 which can be folded in half with some keys folded in a straddling manner according to a modification example 1 of the embodiment will be described below with reference to FIG. 9.

In the keyboard PC 200 of the modification example 1 of the embodiment, the first housing part 261 and the second housing part 262 constituting the housing unit 260 are folded in half in such a manner as to straddle the keys 221 at the central part of the input housing 220. For example, the keys 221 folded in half are a key capable of inputting a signal of B to the arithmetic unit 110 and a key capable of inputting a signal of Y to the arithmetic unit 110 (keys located at upper and lower positions (Dd direction) of the keys 121G/121H shown in FIG. 3). The keys 221 positioned at the boundary part between the first housing part 261 and the second housing part 262 are retained in the first housing part 261 or the second housing part 262. The hinge 163 causes the first housing part 261 and the second housing part 262 to be opened/closed with the boundary part in the upper side Dh1 at which the first housing part 261 and the second housing part 262 are adjacent to each other used as the rotational center. In order that the keys 221 positioned at the boundary part may not be exposed to the outside in the state where the first housing part 261 and the second housing part 262 are closed, a cover 264 is provided. The cover 264 is configured in such a manner as to be capable of expansion and contraction to thereby follow the opening/closing of the first housing part 261 and the second housing part 262 at the boundary part in the lower side Dh2 at which the first housing part 261 and the second housing part 262 are adjacent to each other.

According to the modification example 1 of the embodiment, the first housing part 261 and the second housing part 262 are opened/closed in such a manner as to straddle the keys 221 at the connection section between the first housing part 261 and the second housing part 262. According to the keyboard PC 200 having the configuration described above, it is possible for the user to use the keys 221 having the arrangement and shapes identical to the existing notebook-sized personal computer or the like to carry out a key input.

Figure 10:
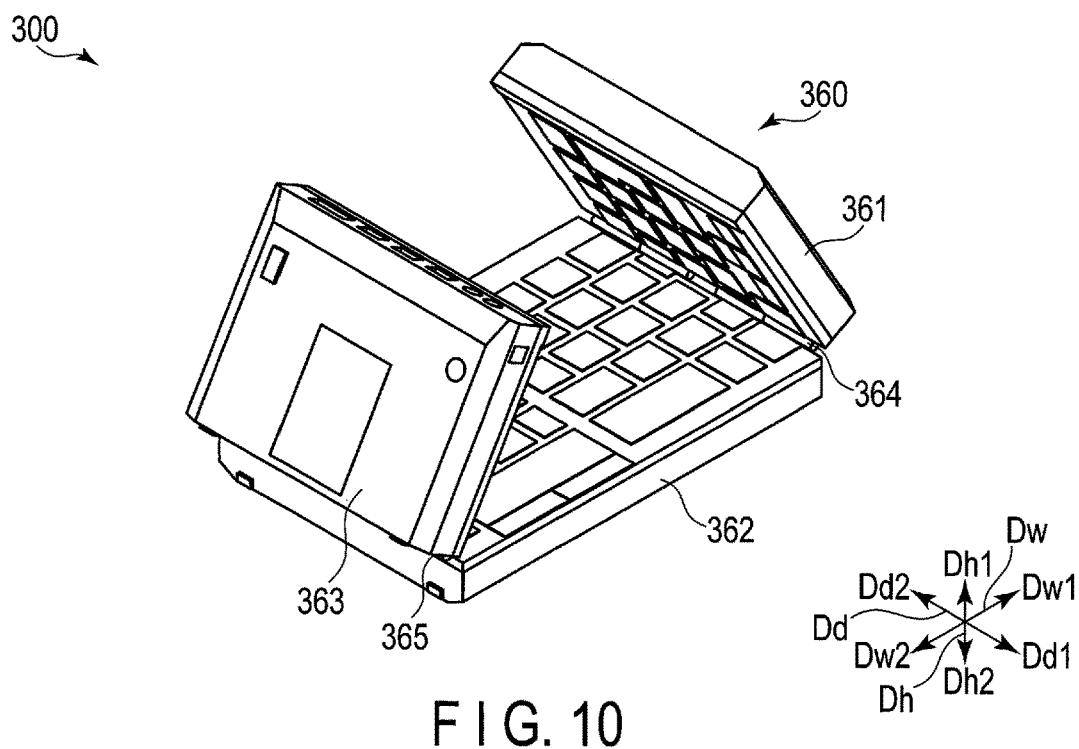
FIG. 10 is an exemplary perspective view showing a keyboard PC 300 of the second modification of the embodiment which can be folded in three in such a manner that the right side part and left side part can be folded toward the center.

The configuration of a keyboard PC 300 which can be folded in three in such a manner that the right side part and left side part thereof can respectively be folded toward the center according to a modification example 2 of the embodiment will be described below with reference to FIG. 10.

The keyboard PC 300 of the modification example 2 of the embodiment is configured in such a manner that a first housing part 361, a second housing part 362, and a third housing part 363 all of which constitute the housing unit 360 are arranged in the width direction Dw. The width of the second housing part 362 is about twice the width of each of the first housing part 361 and the third housing part 363. The first hinge 364 causes the first housing part 361 to be opened/closed with respect to the second housing part 362 with the boundary part in the upper side Dh1 at which the first housing part 361 and the second housing part 362 are adjacent to each other used as the rotational center. The second hinge 365 causes the third housing part 363 to be opened/closed with respect to the second housing part 362 with the boundary part in the upper side Dh1 at which the second housing part 362 and the third housing part 363 are adjacent to each other used as the rotational center.

According to the modification example 2 of the embodiment, it is possible to store a constituent member relatively elongated in the width direction Dw inside the second housing part 362 having a width obtained by adding the widths of the first housing part 361 and the third housing part 363 together. An example of the constituent member is, for example, a secondary battery having relatively high battery capacity. It is extremely difficult to fold the secondary battery in such a manner that the battery can be opened/closed due to the battery characteristics thereof.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

An electronic device may be configured in such a manner that a work mode in which the device is used for business purposes and a leisure mode in which the device is used for personal purposes can be selected, because the device is made easy to carry and hence the area in which use of the device is conceivable is wide. The electronic device may be configured in such a manner that the Thin Client mode in which arithmetic processing and data storage processing are carried out by a remote server can be selected while the functions of the hardware are kept to the minimum limit. The electronic device may be configured in such a manner that the input housing is made to function as a keyboard of the Bluetooth form, whereby the input housing is made usable as a keyboard for an information mobile terminal such as a smartphone or the like. The electronic device may be configured in such a manner that when a mail or the like or specific information is received, the user can be notified of the reception by vibration or sound. The electronic device may be configured in such a manner as to be able to carry out a telephone call. The electronic device may be configured in such a manner that the user can recognize the voice of a person at the other end by bone vibration while pressing his or her ear against the housing unit or the like. The electronic device may be configured in such a manner that data is stored in a wearable display device provided with a memory. The electronic device may be configured in such a manner that the device is provided with a solar cell panel for electric power generation, and the power-supply unit is charged by the solar cell panel. Particularly, the electronic device may be provided with a function of enabling the electronic device to obtain a minimum limit of electric power by which the arithmetic unit and the antenna unit can be operated and the electronic device can be activated by means of the solar cell panel, and notify the user of the current position of the electronic device. The electronic device may be configured in such a manner as to be provided with a charging cradle configured to charge the power-supply unit when the housing unit is brought into contact with the charging cradle or is made in close vicinity to the charging cradle. The electronic device may be provided with a configuration contrived in such a manner that an IC chip capable of electronic payment is added to the housing unit, and when, in a shop or the like, the housing unit is made close to a payment device, account processing is thereby carried out. The electronic device may be provided with a function of enabling the user to input information in the state where the housing unit is closed by writing information on the surface of the housing unit by means of a digitizer pen as in the case of making a note.

The electronic device may be provided with a function of maintaining the opened state of the housing unit in order that key input may not be adversely affected even when the device is used by being placed on a soft and uneven place such as a lap or the like. The electronic device may be provided with an accommodation implement capable of accommodating therein the device when the device is carried or is not in use. Particularly, the accommodation implement can be configured in such a manner that a bottom cover thereof is formed into a shape of a lap, whereby the electronic device is prevented from slipping down the lap. The electronic device may be provided with a function of affiliating or incorporating a dongle capable of print processing. Particularly, when the electronic device is used at an outside location, contents of a note made at the time of business talks or the like can be printed and kept. The electronic device may be configured in such a manner that the secondary battery of the power-supply unit is made removable (attachable/detachable) so that the discharged secondary battery can be replaced with another one to be used when a charging facility or the like is not available at the outside location. The electronic device may be provided with a configuration contrived in such a manner that, when a specific condition is satisfied, a predetermined design or sound is notified to the outside. The electronic device may be provided with a placing table configured in such a manner as to be outwardly stretchable from the housing unit, and on which a display, a smartphone or the like can be placed. The electronic device may be configured in such a manner that the input housing can be folded in half in the vertical direction into a thin shape enabling storage or one of the folded halves is made rotatable for the purpose of enabling storage. The electronic device may be configured in such a manner that the back surface side of the housing unit is made a mirror surface.

The electronic device may be configured in such a manner that input or operation can be carried out by making a gesture with respect to the camera provided in the wearable display device. The electronic device may be configured in such a manner that the device can be operated by shaking the housing unit. For example, the electronic device may be configured in such a manner that an operation of setting the device to playback or stop can be carried out by shaking the housing unit once, and an operation of setting the device to fast-forward or the like can be carried out by shaking the housing twice. The electronic device may be configured in such a manner that in the display of the wearable display device of an augmented reality (AR) screen, when the head is moved, a position viewable is fixed, when the head is shaken or corrected, the screen is fixed, when the head is moved forward, the image is magnified and, when the head is moved backward, the image is reduced.

The electronic device may be configured in such a manner that when the ID or the like of a connected wearable display device is checked, if it is determined that the ID is not an authenticated ID or the like, the electronic device is not started. The electronic device may be configured in such a manner that when a password is input on the keyboard and, if it is determined that the input password is an authenticated password, the power supply is started, and the key input in the opened state is enabled. The electronic device may be configured in such a manner a print of keys is displayed on the AR screen of the wearable display device and, even when the key input of the user is viewed by another person, the key-input information cannot be comprehended by another person. The electronic device may be configured in such a manner that when a biometric authentication is carried out in the closed state and, as a result, if it is determined that the user is not an appropriate user, the device is not started or data is deleted or the fact is informed to a predetermined device. The electronic device may be configured in such a manner that security is released by inputting a predetermined pattern to be carried out by following (tracing) lattice points. The electronic device may be configured in such a manner that the device can be started only when the device is connected to a specific wearable display device authenticated in advance irrespective of whether or not the password is appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

What is claimed is:

1. An electronic device comprising:
   a processor;
   a foldable keyboard comprising a first keyboard part and a second keyboard part;
   a housing that encloses the processor, wherein the housing comprises a first housing part and a second housing part, the first housing part comprises the first keyboard part, the second housing part comprises the second keyboard part, and the first housing part and the second housing part are configured to be opened or closed relative to one another by folding the housing; and
   an output terminal that supplies an image signal output from the processor to an external display device, wherein the electronic device includes no display device,
   wherein the first housing part and the second housing part are formed in such a manner that, in a state where the first housing part and the second housing part are closed, a thickness in a height direction of the first housing part and a thickness in the height direction of the second housing part become gradually less from a folded portion end to a leading end,
   one of the first housing part and the second housing part comprises a space key having a first rectangular shape,
   the other of the first housing part and the second housing part comprises a touch pad having a second rectangular shape,
   the space key and the touch pad are positioned adjacent to each other, a connection section between the first housing part and the second housing part being between the space key and the touch pad, in a state where the first housing part and the second housing part are opened, and
   the space key and the touch pad are arranged so that a lower edge of the space key and a lower edge of the touch pad are on the same line.

2. The electronic device of claim 1, wherein
   at least one of the first housing part or the second housing part comprises an operating section on an external surface in a state where the first housing part and the second housing part are closed, and
   the operating section turns on or off the processor.

3. The electronic device of claim 1, wherein the output terminal is compatible with a type-C Universal Serial Bus (USB).

4. The electronic device of claim 1, further comprising:
an antenna unit comprising an antenna element connected to the processor and configured to transmit or receive a radio wave, wherein
at least one of the first housing part or the second housing part retains the antenna element at positions separate from outermost sections of the at least one.

5. The electronic device of claim 1, wherein at least one of the first housing part or the second housing part comprises an insertion port which is electrically connected to the processor and into which an external recording medium can be inserted in a counter surface to be opposed to the other of the first housing part and the second housing part in a state where the first housing part and the second housing part are opened, and to be exposed in a state where the first housing part and the second housing part are closed.

6. The electronic device of claim 1, wherein the processor recognizes a configuration of the display device through the output terminal, and outputs the image signal in a form made conformable to electrical specifications of the display device.

7. The electronic device of claim 1, further comprising:
an antenna unit comprising antenna elements connected to the processor and configured to transmit or receive a radio wave, wherein
at least one of the first housing part or the second housing part retains the antenna elements at positions of outer edges not overlapping with at least part of the processor.

8. The electronic device of claim 1, further comprising:
a power-supply unit retained in one of the first housing part and the second housing part, that supplies electric power to the processor, wherein
the processor is retained in the other of the first housing part and the second housing part.

9. The electronic device of claim 1, wherein the processor recognizes a configuration of the display device through the output terminal, and outputs the image signal in a form made conformable to an application corresponding to the display device.

10. The electronic device of claim 1, wherein at least one of the first housing part or the second housing part comprises an open/close sensor that detects an opened or closed state of the first housing part and the second housing part in a part of a side face to be opposed to a side face of the other of the first housing part and the second housing part in a state where the first housing part and the second housing part are opened, or in a part of a top surface to be opposed to a top surface of the other of the first housing part and the second housing part in a state where the first housing part and the second housing part are closed.

11. The electronic device of claim 1, wherein at least one of the first housing part or the second housing part comprises a High-Definition Multimedia Interface (HDMI) terminal in a side face at an inner side with respect to a position of a user at time of use, and comprises a terminal for sound in the side face at a front side with respect to the position of the user at time of use.

12. The electronic device of claim 1, wherein the first housing part and the second housing part are formed in such a manner that, in a state where the first housing part and the second housing part are opened, a thickness in a height direction at each of both ends of the first housing part and the second housing part is less than a thickness in the height direction at a center of the first housing part and the second housing part.

13. The electronic device of claim 1, wherein at least one of the first housing part or the second housing part comprises elastically-deformable shock-absorbing members at parts of a side face to be opposed to a side face of the other of the first housing part and the second housing part in a state where the first housing part and the second housing part are opened.

14. The electronic device of claim 1, further comprising:
a power-supply unit configured to supply electric power to the processor and retained in one of the first housing part and the second housing part, wherein
the one retaining the power-supply unit comprises a housing having a shape conformable to a size of the power-supply unit.

15. The electronic device of claim 1, wherein the first housing part and the second housing part are connected to each other in such a manner that the first housing part and the second housing part can be opened or closed between a key configured to input a signal of G to the processor and a key configured to input a signal of H to the processor.

16. The electronic device of claim 1, wherein the first housing part and the second housing part are opened or closed with respect to a connection section between the first housing part and the second housing part without straddling any keys at the connection section.

17. The electronic device of claim 1, wherein the first housing part and the second housing part are opened or closed with respect to a connection section between the first housing part and the second housing part with straddling any keys at the connection section.

18. An electronic device comprising:
a processor;
a foldable keyboard comprising a first keyboard part and a second keyboard part;
a housing that encloses the processor, wherein the housing comprises a first housing part and a second housing part, the first housing part comprises the first keyboard part, the second housing part comprises the second keyboard part, and the first housing part and the second housing part are configured to be opened or closed relative to one another by folding the housing; and
an output terminal that supplies an image signal output from the processor to an external display device, wherein the electronic device includes no display device,
wherein
the first keyboard part is adjacent to the second keyboard part in a first direction, in a state where the first housing part and the second housing part are opened,
the first keyboard part includes a first key, a second key, and a third key,
the second keyboard part includes a fourth key adjacent to the first key, a fifth key adjacent to the second key, and a sixth key adjacent to the third key,
a width of the first key is larger than each of a width of the second key, a width of the third key, a width of the fourth key, and a width of the fifth key,
a width of the sixth key is larger than each of the width of the second key, the width of the third key, the width of the fourth key, and the width of the fifth key,
the width of the second key is larger than the width of the third key,
the width of the fifth key is larger than the width of the fourth key,
edges of the first key, the second key, and the third key facing the second keyboard part are on the same line in a second direction different to the first direction, and edges of the fourth key, the fifth key, and the sixth key facing the first keyboard part are on the same line in the second direction.

19. The electronic device of claim 1,
wherein at least one of the first housing part or the second housing part comprises a biometric sensor configured to start or stop the processor on the basis of authentication based at least in part on biological information of a user.

\* \* \* \* \*